United States Patent [19]

Mierek

[11] Patent Number: 4,983,087
[45] Date of Patent: Jan. 8, 1991

[54] SCREW TYPE BALE HANDLING DEVICE

[76] Inventor: James V. Mierek, Ava, N.Y. 13303

[21] Appl. No.: 795,208

[22] Filed: Nov. 5, 1985

[51] Int. Cl.$^5$ .......................................... A01D 87/00
[52] U.S. Cl. .................... 414/24.5; 294/121; 414/721
[58] Field of Search ............ 414/24.5, 24.6, 721; 294/61, 121

[56] References Cited

U.S. PATENT DOCUMENTS

| | | |
|---|---|---|
| 39,128 | 7/1863 | Dick . |
| 62,970 | 3/1867 | Parker et al. .................... 294/121 |
| 68,690 | 9/1867 | Birge . |
| 73,515 | 1/1868 | Dewey . |
| 85,437 | 12/1868 | Elliott .............................. 294/121 |
| 177,863 | 5/1876 | McCormick . |
| 2,205,550 | 6/1940 | Wehr ............................ 294/121 X |
| 3,276,608 | 10/1966 | Pinney ............................ 294/121 |
| 3,934,726 | 1/1976 | Martin ............................ 414/24.5 |
| 4,027,773 | 6/1977 | Kenworthy . |
| 4,040,534 | 8/1977 | Kenworthy . |
| 4,264,252 | 4/1981 | Jennings et al. .................. 414/24.5 |
| 4,329,103 | 5/1982 | Miller ............................ 414/24.5 |
| 4,367,062 | 1/1983 | Duenow .......................... 414/24.5 |
| 4,583,900 | 4/1986 | Cooley ............................ 414/24.5 |

FOREIGN PATENT DOCUMENTS

| | | | |
|---|---|---|---|
| 453216 | 12/1927 | Fed. Rep. of Germany ........ 294/61 |
| 1481870 | 6/1969 | Fed. Rep. of Germany ........ 294/121 |
| 40473 | 2/1915 | Sweden ........................... 294/121 |
| 678026 | 8/1979 | U.S.S.R. .......................... 294/121 |

OTHER PUBLICATIONS

Hay Balers (Vermeer), Vermeer Manufacturing Co., Pella, Iowa.
One Man Hay System (Vermeer), Vermeer Manufacturing Co., Pella, Iowa.

Primary Examiner—Frank E. Werner
Assistant Examiner—James T. Eller, Jr.
Attorney, Agent, or Firm—Wall and Roehrig

[57] ABSTRACT

A tractor mountable handling device for handling baled material, such as giant round hay bales, employs an open center, open coil helical screw that is screwed into the bale, and a frame for holding the bale on the three-point hitch of the tractor or on a front loader thereof. The helical screw is rotated under power to engage the baled material, and is reversely rotated to release the material. The pitch of the screw is selected small enough so that the bale will not rotate and release itself from the helical screw under its own weight while being handled by the device.

3 Claims, 4 Drawing Sheets

SCREW TYPE BALE HANDLING DEVICE

BACKGROUND OF THE INVENTION

This invention relates to devices for handling bales of hay or other material, and is more particularly directed to a device that can be tractor mounted and is well suited for picking up and moving large bales of any cross-sectional geometry.

Recently, round baling machines have become predominant for baling hay, because of the costs of labor and of storage facilities for the hay. The round baling process permits a one-man haying operation, and produces large round hay bales, which are packed weathertight and can remain outdoors until needed. However, these large round bales are difficult to lift and stack, and require elaborate equipment for transport of the bales.

Also, because of their immense size and round shape, it is not a simple matter to lift a large round hay bale by ordinary techniques. Typically, a fork system of elongated tines is employed to engage a side of the round bale, and a swinging grappling assembly reaches over the bale to grasp the reverse side of the bale. One such arrangement is shown in U.S. Pat. No. 4,264,252. Another system using a similar principle is shown in U.S. Pat. No. 3,934,726.

With these systems, it is difficult to lift the bale from above, and size adjustment is usually required if the round hay bales are not all the same general size.

OBJECTS AND SUMMARY OF THE INVENTION

It is an object of this invention to provide a device for handling baled material which avoids the drawbacks of the prior art.

It is another object of this invention to provide a bale handling device which is simple in operation and construction, and which can securely hold and manipulate bales under various conditions.

According to an aspect of this invention, a tractor mountable handling device for handling bales of hay, crop, or other balable materials, has a frame that is mounted onto a tractor vehicle, such as at the tractor's three-point hitch, fork lift and/or a front loader. A shaft is journalled on a bearing member mounted on the frame, and is driven by a rotational drive motor, which can be an electric motor, a hydraulic or pneumatic motor. A helical screw is connected at a proximal end to the shaft, and the other distal end of the screw is open and pointed for engaging the baled material. Favorably, the pitch of the screw is selected small enough so that the bale will not unwind from the helical screw under its own weight while being lifted. In the preferred embodiments, an open-center open-coil worm is used as the screw. In several embodiments, the frame includes a rear frame member held fixed on a support on the tractor vehicle, a swinging frame member having a pivot member journalled at a lower part of the rear frame member, and an upper mount on which the bearing member, drive motor, and screw are mounted. A brace member is coupled to the upper mount of the swinging frame member and can be selectively connected at either of two positions along its length to the rear frame member. This construction allows the screw to be held in either a horizontal handling position in which the bale is engaged from the side or end, or a vertical handling position in which the bale is engaged from above.

In other embodiments, two or more screws can be employed, which can be counter-rotating.

The above and many other objects, features and advantages of this invention will become more apparent from the ensuing detailed description of the preferred embodiments thereof, when considered in connection with the following drawings.

DETAILED DESCRIPTION OF THE PREFERRED EMBODIMENTS

Figure 1:
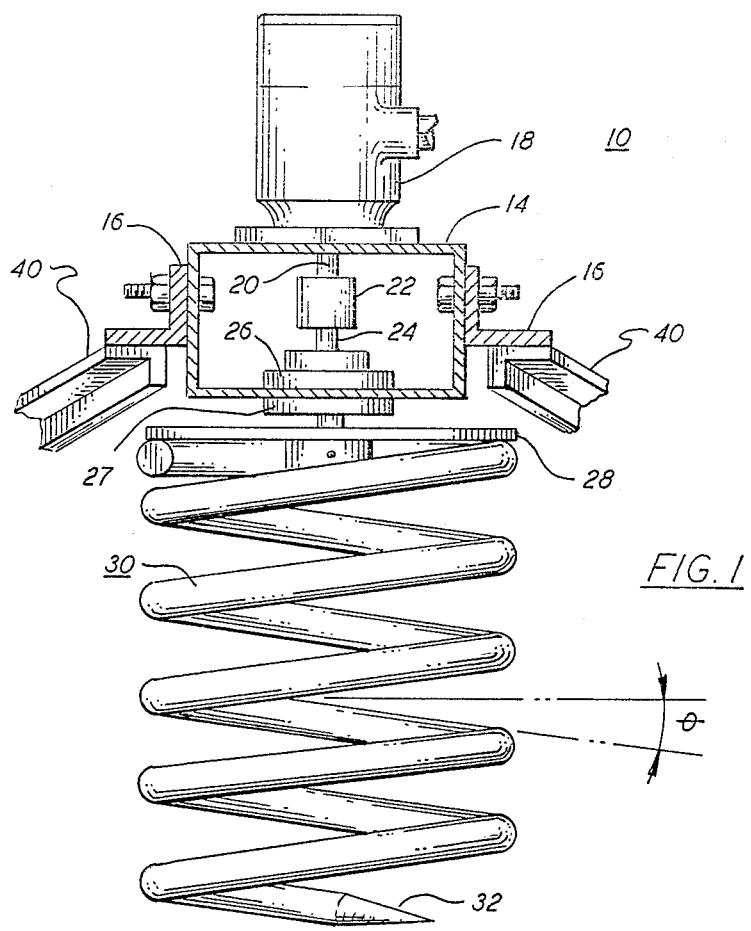
FIG. 1 is an isometric view, partly in section, of the screw portion of a preferred embodiment of this invention.
Figure 2:
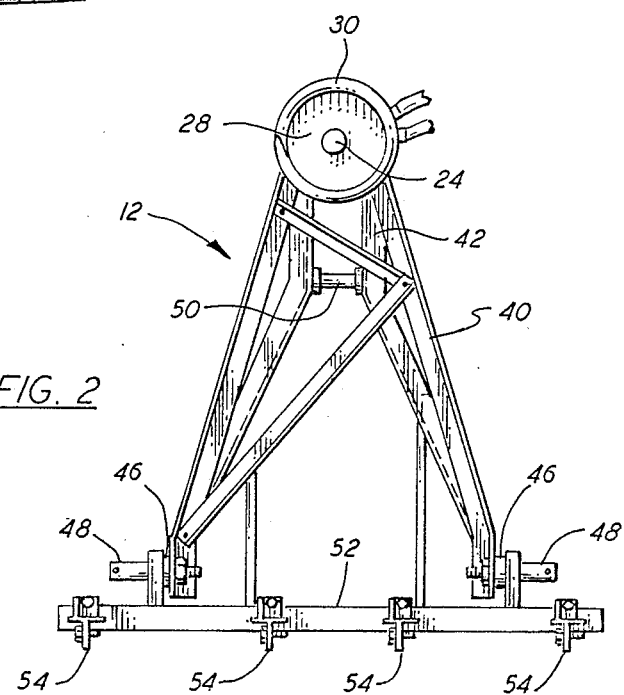
FIG. 2 is a front elevational view of a first preferred embodiment of this invention.
Figure 3:
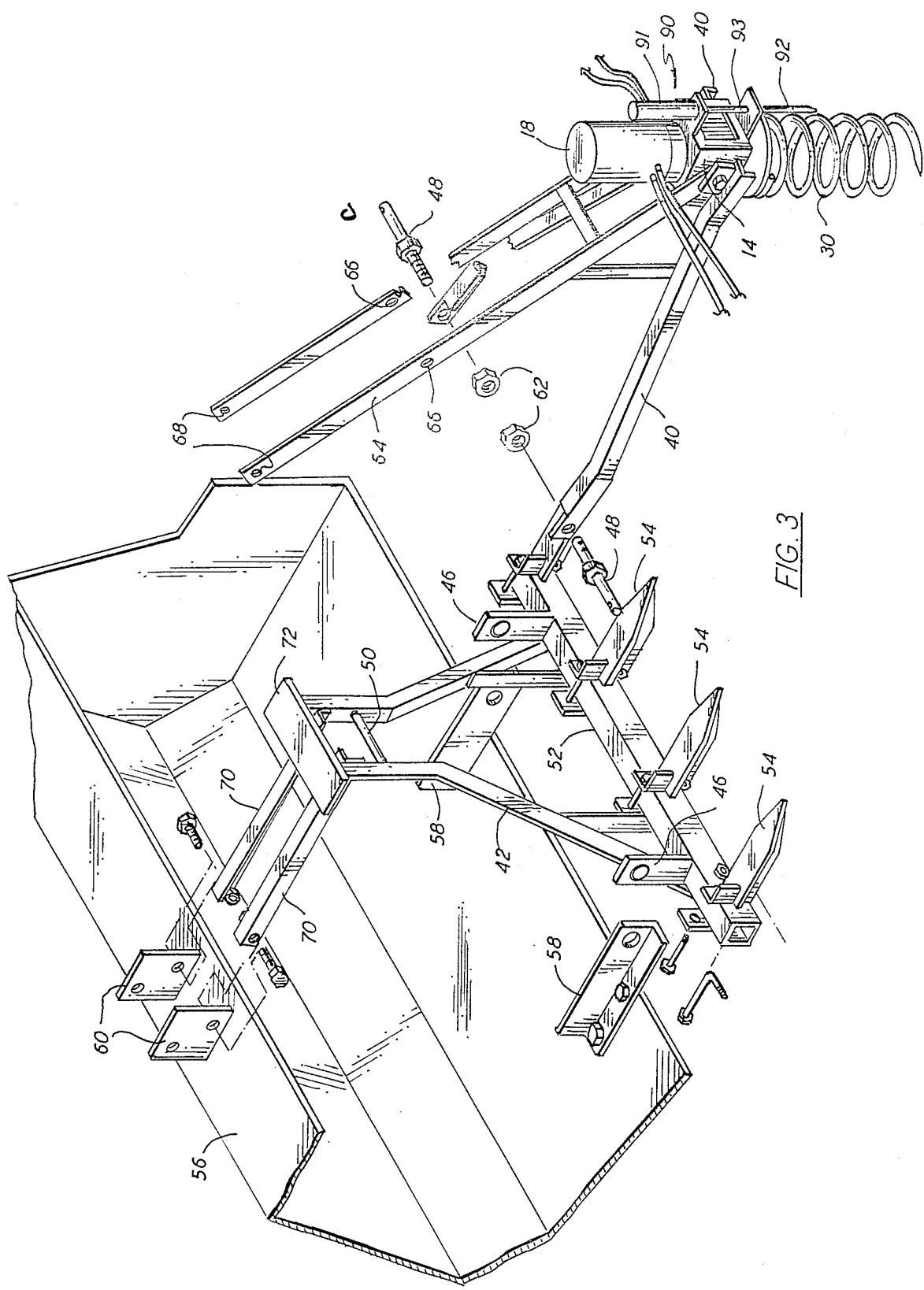
FIG. 3 is a partly disassembled view of the first embodiment of this invention.

With reference to the drawings, and initially to FIGS. 1-3 thereof, the bale handling device of this invention 10 has a frame 40 and a bearing box 14 connected by means of a pair of mounts 16 to the frame 12. A hydraulic motor 18 is mounted on one side of the bearing box 14. An output shaft 20 of the motor 18 is connected by a copula 22 in the box 14 to a drive shaft 24. A radial bearing 27 and a thrust bearing 26 are mounted in the wall of the box 14 journals the shaft 24.

As shown in FIG. 1, below the box 14 the shaft 24 is connected to a plate 28 on which is mounted a helical worm or screw 30. The latter in this embodiment is an open core coil worm having an open, pointed lower end 32. In this embodiment, the screw worm 30 has a pitch angle of about 10–15 degrees so that baled material into which the screw worm 30 has been turned will not unwind itself under its own weight from the screw worm 30. The cross-sectional configuration of the screw worm can take any form such as a cylinder, a square or a hexagon.

As shown in FIGS. 2 and 3, the frame 12 is formed of a front frame member 40 and a rear frame member 42. The front frame member 40 is swingably mounted on the rear frame member 42 by means of a pair of hinged connection plates 46 formed on the rear frame member 42.

A pair of pintles 48 and an upper mounting bar 50 are provided on the rear frame member 42 for mounting the device on a three-point mounting, for example, on a standard three-point tractor hitch of a tractor vehicle.

A fork bar 52 is formed at the bottom of the rear frame member 42 and has a plurality of tines or claws 54 affixed on it, and these tines 54 project in the forward direction.

As it is desired to provide a system for mounting on a front loader of a tractor vehicle, details of the structure for linking this embodiment with a bucket 56 of a tractor front loader are shown in FIG. 3. Here, a pair of attaching members 58 are mounted on the lower wall of the bucket 56, and a pair of upper mounting plates 60 are affixed onto the top wall of the bucket 56. The pintles 48 have partly threaded portions which are fit into bolt holes in the mounting plates 46, the front frame member 40 and the connector plates 46 of the rear frame member 42 to effect the swingable mounting of the front and rear frame members 40 and 42.

A pair of support bars 64 are bolted to the bearing box 14 and extend back thereof towards the bucket 56. Intermediate bolt holes 66 and end bolt holes 68 are provided in the support bar 64 for connection to the upper mounting plate 60 or to the rear frame member 42 directly, a top plate 72 is disposed at the upper side of the rear frame member 42. A pair of frame support bars 70 are bolted to the rear frame member 42 and to the upper mounting plates 60 for bracing the rear frame member 42 on the bucket 56.

Figure 5:
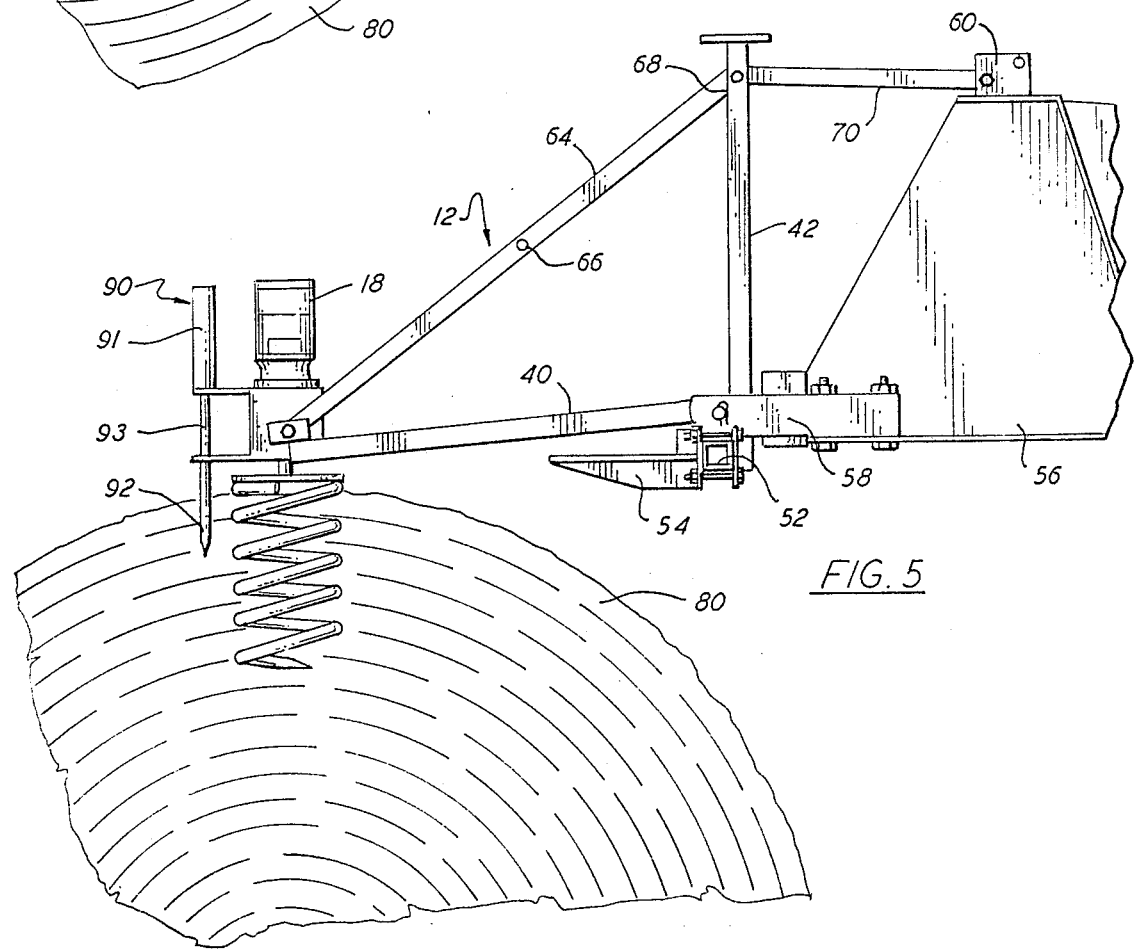
FIG. 5 is a side elevation of the first embodiment, in a second, vertical mode.

As shown in FIGS. 3 and 5, the present apparatus can be equipped with a retractable spike unit 90 which can be passed into an engaged bale to prevent the bale from turning when hanging in a vertical position from the frame. The unit includes a double acting hydraulic cylinder 91 secured to the bearing box by any suitable means. A spike 92 is affixed to the retractable rod 93 of the cylinder so that it can be raised and lowered into and out of engagement with a bale that has been screwed onto the worm. In practice, the spike is extended as the bale is being screwed onto the worm so that it penetrates the bale to a sufficient depth to prevent the bale from turning under its own weight as it is being transported or the like. The spike is retracted when it is necessary or desirous to turn the bale for the purpose of accurately positioning during loading, carrying and unloading operations.

Figure 4:
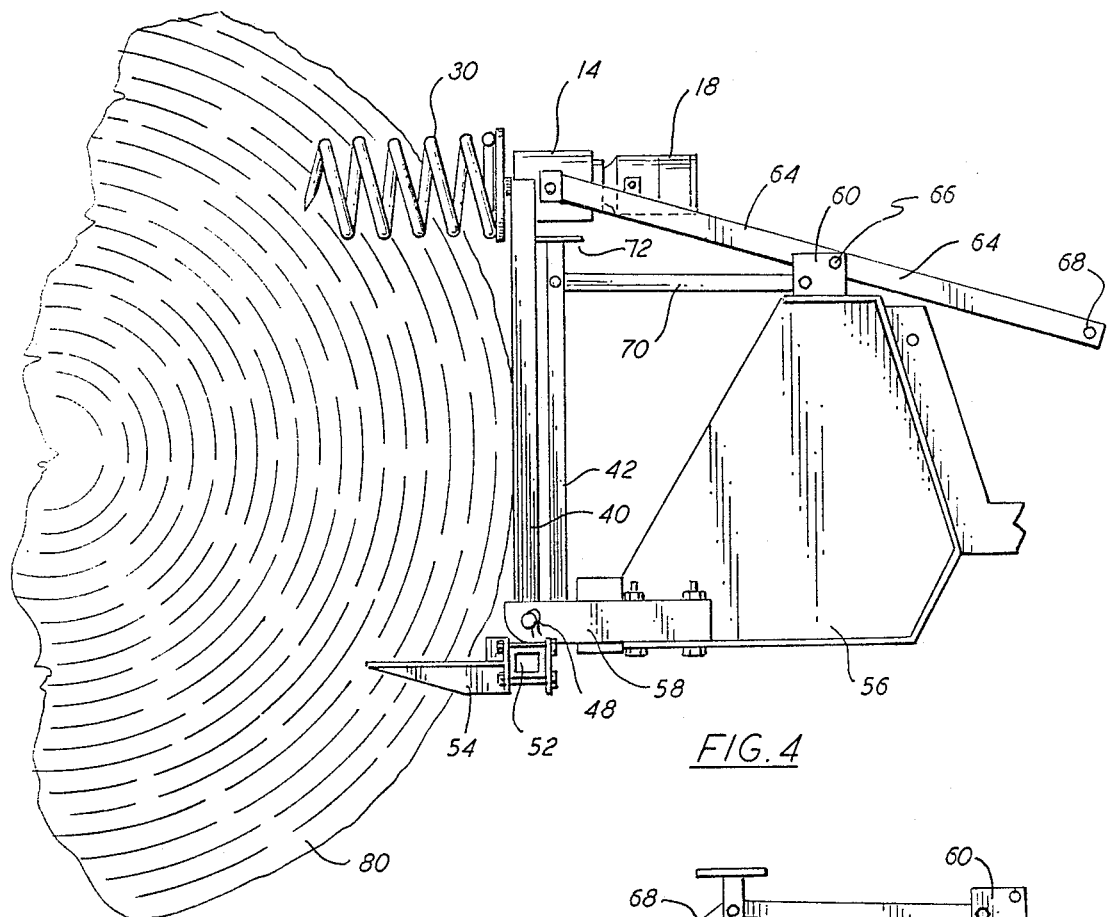
FIG. 4 is a side elevation of the first embodiment, in a first, horizontal mode.

As shown in FIG. 4, with the bars 64 mounted to the upper support plates 60 by means of the intermediate bolts 66, the front frame member 40 is held against the rear frame member 42 in an upright position, and this defines a horizontal mode of operation for the handling device 10. In this mode, a round bale 80 is approached from the side, as shown, and the screw worm 30 is rotated into the side of the bale 80. It should be understood that the worm can be similarly placed in the end of the bale to produce the same result. The tines 54 enter and grasp the bale 80. These serve both to prevent rotation of the bale during the turning in or screwing out of the screw worm 30, and also help support the weight of the bale 80 when the latter is lifted and/or maneuvered.

As shown in FIG. 5, with the bars 64 bolted by means of the end bolt holes 68 to the rear frame member 42, the front frame member 40 is swung out away from the rear frame member 42, defining a vertical mode of operation for the device 10. Here, the screw worm 30 extends vertically downward, and enters the bale 80 from the top. This permits the bale to be lifted, and then rotated, as need be, so that the bale fits in a tight space among other similar bales. Because of the small pitch of the helical screw worm 30, the bale 80, when lifted, will not unwind itself under its own weight. Here, the bearing box 14 is mounted so it can pivot about its pitch axis, keeping the screw worm 30 vertical.

When using the device 10 of this embodiment, the bale 80 may be approached from any direction, and the helical screw worm 30 may be screwed into the top and lifted, or into the side of the bale 80. After lifting the bale, the device can carry the bale to a place of storage, or can place the bale on some means of transportation, such as a wagon, so that several such bales can be taken together to be placed in storage. When the bale 80 is positioned and ready to be set down again, the helical screw worm 30 can be rotated slowly to turn the bale 80 to fit among other bales or otherwise to fit into a limited clearance area. Then, after the bale has been placed down and is supported from beneath, the helical screw worm 30 can be rotated backwards, and withdrawn from the bale.

The use of two or more power helical screw worms may be recommended or needed, depending on the type, length of cut, moisture content, and density of the baled hay or other material. The bale itself can be round or square. Also, two or more power helical screw worms can be used if it is desired to lift or move two or more bales 80 at one time.

Figure 6:
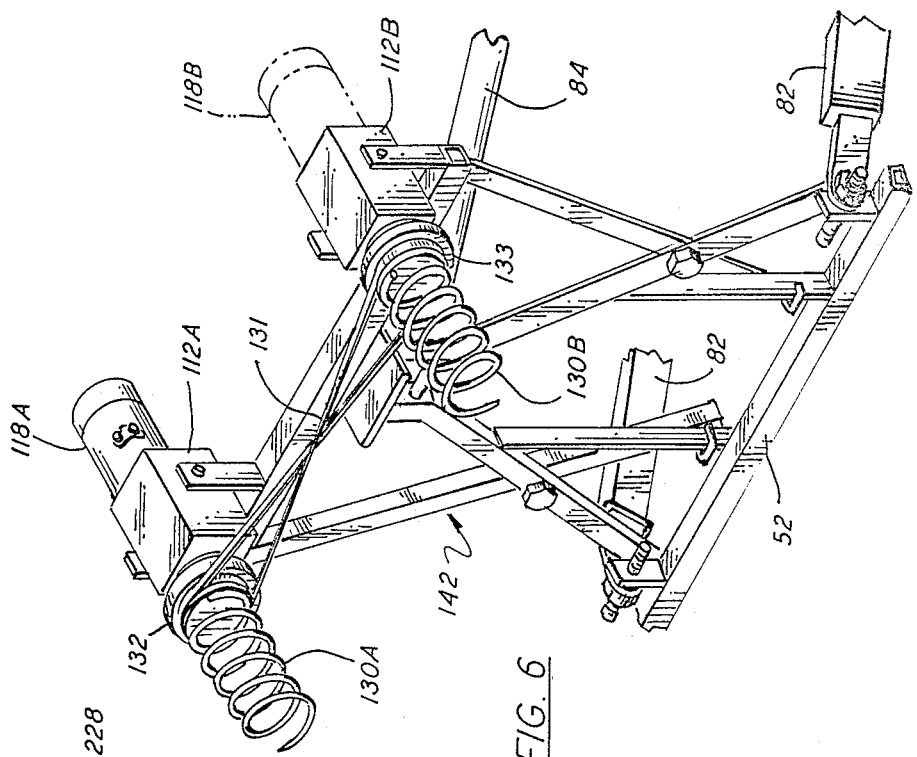
FIG. 6 is a perspective view of a second embodiment of this invention.

With this in mind, a second embodiment of this invention is shown in FIG. 6. Here, lower connector bars 82 and an upper bar 84 of a standard three-point tractor hitch are used as connection points. In this embodiment, elements which are similar to those of the previous embodiment are identified with the same reference numbers, but raised by 100. Accordingly, this embodiment has a front frame member 142 having a lower fork bar 152 (here without being provided with tines) and on which there are mounted a pair of bearing boxes 112A and 112B. A single hydraulic motor 118A, here mounted on the bearing box 112A, drives a pair of helical screw worms 130A and 130B disposed in a generally parallel alignment associated with the bearing boxes 112A and 112B, respectively. To achieve counter rotation of the screw worms 130A and 130B, there is provided a crossed-over drive belt 131 which is mounted on pulleys 132 and 133 coupled to the respective twin screw worms 130A and 130B, one of which is right-handed and one left-handed.

In a variation of this embodiment, the belt drive system 131, 132, 133 can be omitted and a separate hydraulic motor 118B (here shown in ghost lines) can be provided on the second bearing box 112B.

Figure 7:
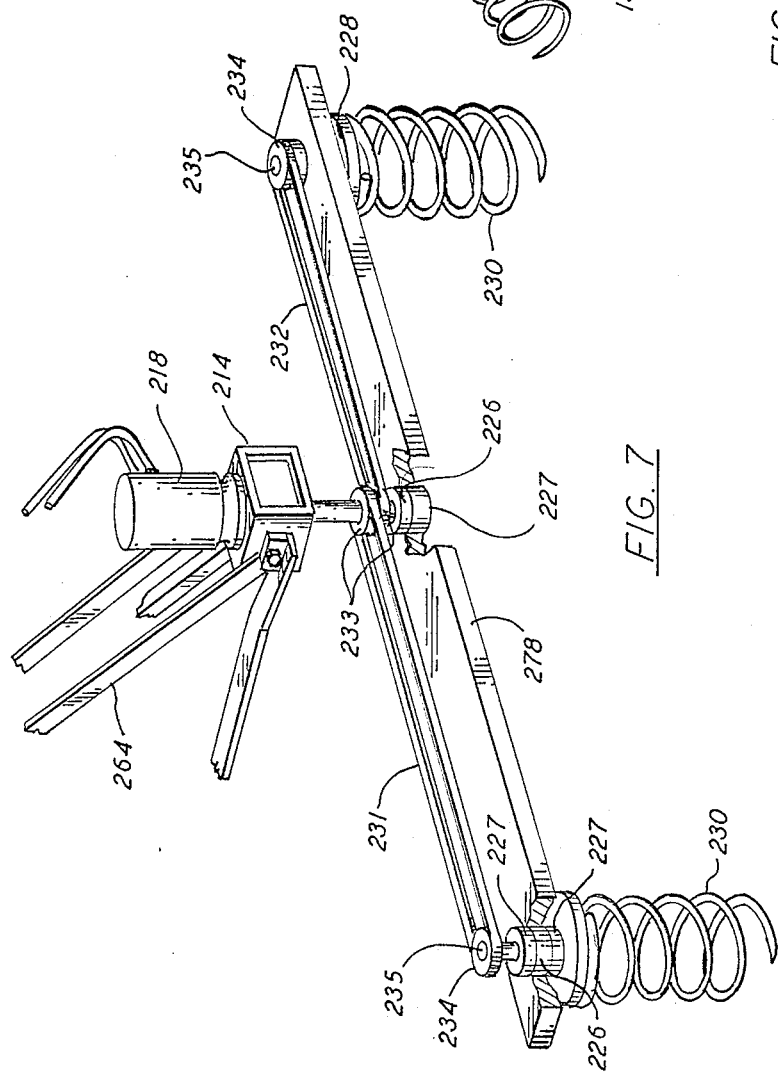
FIG. 7 shows a portion of a third embodiment of this invention.

Still another embodiment of this invention is shown in FIG. 7. Here there are provided twin screw worms 230, both being of a right-handed construction.

A plate 278 is mounted for free rotation on an output shaft 224 that is journalled in a bearing box 214 and driven by the motor 218. A pair of belts or chains 231 and 232 ride in a pulley system 233 on the shaft 224 and drive respective pulleys 234, which turn shafts 235 journalled in respective bearings 226 and 227 on the plate 278 to rotate the helical screw worms 230.

Here, the helical screw worms 230 turn in the same direction, but can alternatively be arranged to counter-rotate. Also, a gear or chain drive can be used instead of the belt drive.

In this embodiment, the plate 278 and the supported screw worms 230 are suspended from the single shaft 224 so that the motor 218 that drives the shaft will also turn the entire assembly. That is, unless the plate 228 is held against rotation by means of bales of hay which are resting on a surface, the entire assembly, together with any bales held aloft, will rotate. When the assembly is hanging free, with or without suspended bales, it will turn in the desired direction. If the pitch of the screw worms is selected small enough and the turning movement is slow, the bale or bales suspended from the screw worms 230 will not rotate off the screw worms. Then the bale or bales can be oriented and set down at the location desired.

While several preferred embodiments have been described herein above with reference to the drawings, it is to be understood that the invention is not limited to those embodiments, and that many modifications and variations would present themselves to those skilled in the art without departing from the scope and spirit of this invention, as defined in the appended claims.

I claim:

1. Tractor mountable handling apparatus for handling bales of material comprising
   a frame mountable onto a tractor vehicle;
   a bearing member mounted on said frame;
   a shaft journalled in said bearing member;
   rotary drive means mounted on said bearing member and including coupling means connecting to said shaft for selectively rotating the same in either direction and for holding the same against rotation; and
   a helical screw mounted coaxially on said shaft having an open end for engaging the baled material and having a pitch selected small enough so that the bale will not unwind from the helical screw under its own weight while being handled by said apparatus;
   wherein said frame is a two position frame formed of a rear frame member held fixed on a support on said tractor vehicle, a swinging frame member having a pivot member journalled at a lower side of said rear frame member and an upper mount on which said bearing member is mounted, and a brace member coupled to said upper mount and selectively connected at either of two positions along its length to said rear frame member such that said screw is held in either of a horizontal handling position when said swinging frame member is swung up to said rear frame member or a vertical handling position when said swinging frame member is swung out from said rear frame member.

2. Tractor mountable handling apparatus according to claim 1, wherein said frame includes one or more engaging claws extending outward from said frame for engaging and supporting a bale engaged by said screw and holding the bale against rotation.

3. Tractor mountable handling apparatus according to claim 1 that further includes a spike mounted adjacent said helical screw and a linear drive means to move the spike from a raised position downwardly to an extended position whereby the spike can be driven into a bale engaged by said screw.

* * * * *